(12) United States Patent
Girt (10) Patent No.: US 7,842,409 B2
(45) Date of Patent: Nov. 30, 2010

(54) ANTI-FERROMAGNETICALLY COUPLED PERPENDICULAR MAGNETIC RECORDING MEDIA WITH OXIDE

(75) Inventor: Erol Girt, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 572 days.

(21) Appl. No.: 10/977,435

(22) Filed: Nov. 1, 2004

(65) Prior Publication Data

US 2005/0058855 A1    Mar. 17, 2005

Related U.S. Application Data (63) Continuation-in-part of application No. 10/179,876, filed on Jun. 26, 2002, now Pat. No. 6,815,082.

(60) Provisional application No. 60/337,287, filed on Nov. 30, 2001.

(51) Int. Cl.
*G11B 5/66* (2006.01)

(52) U.S. Cl. .................. 428/828.1; 428/836.2

(58) Field of Classification Search .............. None
See application file for complete search history.

(56) References Cited

U.S. PATENT DOCUMENTS

| | | | |
|---|---|---|---|
| 5,408,377 A | 4/1995 | Gurney et al. | |
| 5,598,308 A | 1/1997 | Dieny et al. | |
| 5,792,564 A | 8/1998 | Hikosake et al. | |
| 5,815,342 A | 9/1998 | Akiyama et al. | |
| 5,851,643 A | 12/1998 | Honda et al. | |
| 5,981,054 A * | 11/1999 | Hikosaka et al. | 428/328 |
| 6,031,692 A | 2/2000 | Kawawake et al. | |
| 6,280,813 B1 | 8/2001 | Carey et al. | |
| 6,372,330 B1 | 4/2002 | Do et al. | |
| 6,468,670 B1 * | 10/2002 | Ikeda et al. | 428/611 |
| 6,537,684 B1 | 3/2003 | Doerner et al. | |
| 6,815,082 B2 * | 11/2004 | Girt | 428/828.1 |
| 6,881,497 B2 * | 4/2005 | Coffey et al. | 428/828.1 |
| 7,175,925 B2 * | 2/2007 | Chen et al. | 428/831 |
| 7,279,240 B2 * | 10/2007 | Nolan | 428/828 |
| 2002/0045070 A1 | 4/2002 | Sakakima et al. | |
| 2002/0076579 A1 | 6/2002 | Hanawa et al. | |
| 2002/0098390 A1 | 7/2002 | Do et al. | |
| 2002/0132140 A1 | 9/2002 | Igarashi et al. | |

(Continued)

FOREIGN PATENT DOCUMENTS

EP    0 687 917 A2    12/1995

(Continued)

OTHER PUBLICATIONS

U.S. Appl. No. 10/776,223, filed Feb. 12, 2004.

(Continued)

*Primary Examiner*—Kevin M Bernatz
(74) *Attorney, Agent, or Firm*—Hollingsworth & Funk, LLC (57) ABSTRACT

The present invention relates to perpendicular magnetic recording media with improved signal-to-medium noise ratio ("SMNR") and thermal stability, which media include a pair of vertically spaced-apart perpendicular ferromagnetic layers which are anti-ferromagnetically coupled ("AFC") across a non-magnetic spacer layer. The invention is of particular utility in the fabrication of data/information storage and retrieval media, e.g., hard disks, having ultra-high areal recording/storage densities.

16 Claims, 5 Drawing Sheets

U.S. PATENT DOCUMENTS

| | | | |
|---|---|---|---|
| 2003/0022023 A1 | 1/2003 | Carey et al. | |
| 2003/0090831 A1 | 5/2003 | Doerner et al. | |
| 2003/0104247 A1* | 6/2003 | Girt | 428/693 |
| 2004/0053078 A1* | 3/2004 | Kikitsu et al. | 428/694 TM |
| 2005/0214585 A1* | 9/2005 | Li et al. | 428/828 |

FOREIGN PATENT DOCUMENTS

| | | |
|---|---|---|
| EP | 0 994 465 A1 | 4/2000 |
| WO | WO 97/34295 | 9/1997 |
| WO | WO 03/049086 A1 * | 6/2003 |

OTHER PUBLICATIONS

U.S. Appl. No. 10/704,593, filed Nov. 12, 2003.
U.S. Appl. No. 10/701,418, filed Nov. 6, 2003.
U.S. Appl. No. 10/663,698, filed Sep. 17, 2003.
U.S. Appl. No. 10/902,956, filed Aug. 2, 2004.
U.S. Appl. No. 10/676,105, filed Oct. 2, 2003.
Abarra, et al., "Longitudinal magnetic recording media with thermal stabilization layers", American Institute of Physics, vol. 77 No. 16. Oct. 16, 2000.
Fullerton, et al., "Antiferromagnetically coupled magnetic media layers for thermally stable high-density recording", vol. 77 No. 23. Dec. 4, 2000.
Girt et al., "Antiferromagnetically coupled perpendicular recoding media", IEEE Transactions on Magnetics, vol. 39 No. 5 Sep. 2003.
Richter et al., "How antiferromagnetic coupling can stabilize recorded information", IEEE Transactions on Magnetics, vol. 38 No. 5 Sep. 2002.

* cited by examiner

ANTI-FERROMAGNETICALLY COUPLED PERPENDICULAR MAGNETIC RECORDING MEDIA WITH OXIDE

CROSS-REFERENCE TO RELATED APPLICATIONS

This application is a continuation-in-part of the U.S. patent application Ser. No. 10/179,876, filed Jun. 26, 2002 now U.S. Pat. No. 6,815,082, entitled ANTI-FERROMAGNETICALLY COUPLED PERPENDICULAR MAGNETIC RECORDING MEDIA, which relates to and claims priority from U.S. Provisional Application Ser. No. 60/337,287, filed Nov. 30, 2001, the disclosure of both which are hereby incorporated in their entirety by reference.

FIELD OF THE INVENTION

The present invention relates to perpendicular magnetic recording media with improved signal-to-medium noise ratio ("SMNR") and thermal stability, which media include a pair of vertically spaced-apart perpendicular ferromagnetic layers which are anti-ferromagnetically coupled ("AFC") across a non-magnetic spacer layer. The invention is of particular utility in the fabrication of data/information storage and retrieval media, e.g., hard disks, having ultra-high areal recording/storage densities.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer, i.e., a magnetic layer having a relatively low coercivity of about 1 kOe or below, such as of a NiFe alloy (Permalloy), between the non-magnetic substrate, e.g., of glass, aluminum (Al) or an Al-based alloy, and the "hard" magnetic recording layer having relatively high coercivity of several kOe, typically about 3-6 kOe, e.g., of a cobalt-based alloy (e.g., a Co—Cr alloy) having perpendicular anisotropy. The magnetically soft underlayer serves to guide magnetic flux emanating from the head through the hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

Figure 1:
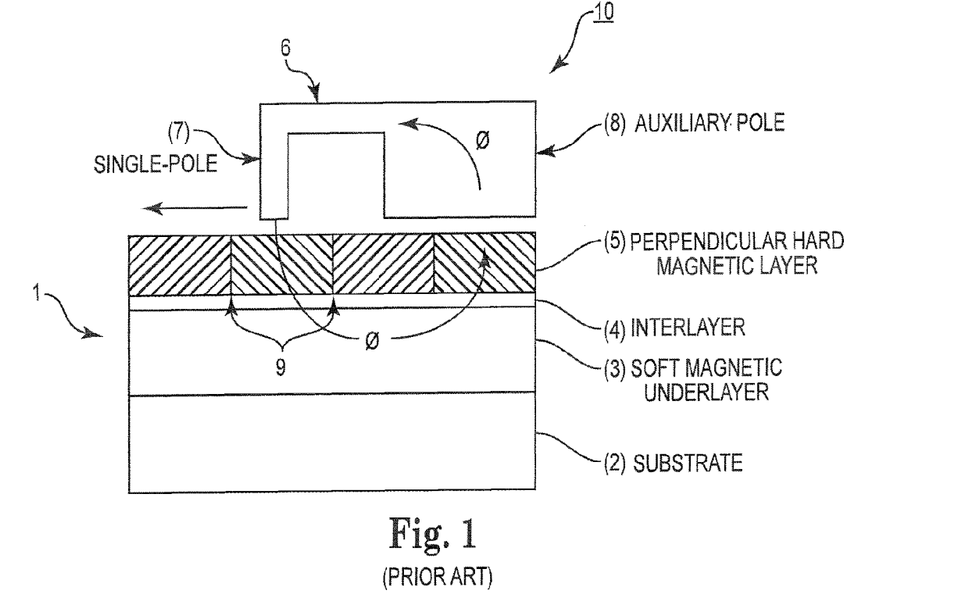
FIG. 1 schematically illustrates, in simplified, cross-sectional view, a portion of a magnetic recording, storage, and retrieval system comprised of a conventional perpendicular-type magnetic recording medium including a soft magnetic underlayer and a single-pole transducer head.

A typical perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 3, 4, and 5, respectively, indicate the substrate, soft magnetic underlayer, at least one non-magnetic interlayer, and vertically oriented, hard magnetic recording layer of perpendicular magnetic medium 1, and reference numerals 7 and 8, respectively, indicate the single and auxiliary poles of single-pole magnetic transducer head 6. Relatively thin interlayer 4 (also referred to as an "intermediate" layer), comprised of one or more layers of non-magnetic materials, serves to (1) prevent magnetic interaction between the soft underlayer 3 and the hard recording layer 5 and (2) promote desired microstructural and magnetic properties of the hard recording layer. As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 5 in the region above single pole 7, entering and travelling along soft magnetic underlayer 3 for a distance, and then exiting therefrom and passing through vertically oriented, hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer, such as of a diamond-like carbon (DLC) formed over hard magnetic layer 5, and a lubricant topcoat layer, such as of a perfluoropolyethylene material, formed over the protective overcoat layer. Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, FeCoC, etc.; interlayer 4 typically comprises an up to about 300 Å thick layer of a non-magnetic material, such as TiCr; and hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, B, and Pd, iron oxides, or a $(CoX/Pd$ or $Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2^{nd}$ type).

In general, an improvement in the signal-to-medium noise ratio (SMNR) of perpendicular magnetic recording media such as described above can be obtained by decreasing the average volume V of the magnetic grains and/or by decreasing interactions between the grains. However, in either instance, thermal stability of the perpendicular media is compromised.

In view of the above, there exists a clear need for improved, high areal recording density, perpendicular magnetic information/data recording, storage, and retrieval media which exhibit both increased signal-to-media noise ratios (SMNR) and thermal stability. In addition, there exists a need for an improved method for manufacturing high areal recording density, perpendicular magnetic recording media which exhibit both increased SMNR and thermal stability, which media can be readily and economically fabricated by means of conventional manufacturing techniques and instrumentalities.

The present invention addresses and solves problems attendant upon the design and manufacture of high bit density perpendicular magnetic media, e.g., obtainment of high SMNR without compromising the thermal stability of the media, while maintaining all structural and mechanical aspects of high bit density recording technology. Moreover, the magnetic media of the present invention advantageously can be fabricated by means of conventional manufacturing techniques, e.g., sputtering.

DISCLOSURE OF THE INVENTION

An advantage of the present invention is an improved, high areal recording density, perpendicular magnetic recording medium.

Another advantage of the present invention is an improved, high areal recording density, anti-ferromagnetically coupled (AFC), perpendicular magnetic recording medium having increased signal-to-noise ratio (SMNR) and thermal stability.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a perpendicular magnetic recording medium, comprising: a substrate; a first ferromagnetic layer; a non-magnetic spacer layer; a second ferromagnetic layer comprised of a granular hard ferromagnetic material. The first ferromagnetic layer and the second ferromagnetic layer are magnetically coupled across said non-magnetic spacer layer.

According to another aspect of the present invention, the foregoing and other advantages are obtained in part by an anti-ferromagnetically coupled ("AFC") perpendicular magnetic recording medium, comprising: (a) a non-magnetic substrate having a surface; and (b) a layer stack formed over the substrate surface. The layer stack comprises, in overlying sequence from the substrate surface: an underlayer comprised of a magnetically soft ferromagnetic material or a plurality of layers of magnetically soft ferromagnetic material separated by thin non-magnetic spacer layers; at least one interlayer; a ferromagnetic stabilization layer with perpendicular anisotropy; a non-magnetic spacer layer; and a perpendicularly anisotropic main recording layer comprised of a granular hard ferromagnetic material. The ferromagnetic stabilization layer and the perpendicularly anisotropic main recording layer are anti-ferromagnetically coupled.

According to embodiments of the present invention, the at least one interlayer is selected from one or more elements selected from the group consisting of ruthenium (Ru), rhenium (Re), iridium (Ir), copper (Cu), silver (Ag), gold (Au), zirconium (Zr), hafnium (Hf), praseodymium (Pr), palladium (Pd) and titanium (Ti), containing minor amounts of bcc-structured elements selected from the group consisting of tungsten (W), molybdenum (Mo), tantalum (Ta), niobium (Nb), chromium (Cr) and vanadium (V).

In accordance with embodiments of the present invention, the at least one interlayer further comprises at least one oxide material containing one or more elements selected from the group consisting of aluminum (Al), silicon (Si), titanium (Ti), vanadium (V), manganese (Mn), cobalt (Co), nickel (Ni), zinc (Zn), yttrium (Y), zirconium (Zr), niobium (Nb), molybdenum (Mo), hafnium (Hf) and tungsten (W). The at least one interface layer is from 0.2 nanometers (nm) to about 40 nm, preferably between 4 nm to about 12 nm thick.

In accordance with particular embodiments of the present invention, the non-magnetic spacer layer is from about 2 to about 20 angstroms (Å) thick, and is selected to maximize anti-ferromagnetic or ferromagnetic coupling between the stabilization layer and main recording layer, and comprises a material selected from the group consisting of ruthenium (Ru), rhodium (Rh), iridium (Ir), chromium (Cr), copper (Cu), rhenium (Re), vanadium (V), and their alloys. The layer stack (b) optionally further comprises: at least one ferromagnetic interface layer at at least one interface between the non-magnetic spacer layer and the main recording layer and the stabilization layer.

According to embodiments of the present invention, the non-magnetic spacer layer further comprises an oxide material containing one or more elements selected from the group consisting of chromium (Cr), aluminum (Al), silicon (Si), titanium (Ti), vanadium (V), manganese (Mn), cobalt (Co), nickel (Ni), zinc (Zn), yttrium (Y), zirconium (Zr), niobium (Nb), molybdenum (Mo), hafnium (Hf) and tungsten (W). In certain embodiments, the non-magnetic spacer layer comprises Ru with 2 to 10 molar % of $SiO_2$, or Ru with 2 to 7 molar % of $Nb_2O_5$, or Ru with 2 to 7 molar % of $Cr_2O_3$, or Ru with 2 to 9 molar % of $WO_3$, or Ru with 2 to 15 molar % of $ZrO_2$, or Ru with 2 to 15 molar % of $TiO_2$.

In accordance with particular embodiments of the present invention the at least one interface layer is present at the interface between said non-magnetic spacer layer and said main recording layer. In certain embodiments, the at least one interface layer is present at the interface between the non-magnetic spacer layer and the stabilization layer. In other embodiments the interface layer is present at the interfaces between the non-magnetic spacer layer and each of the main recording layer and the stabilization layer.

According to embodiments of the present invention, the at least one interface layer comprises an about 1 monolayer to an about 40 Å thick layer of a ferromagnetic material having a saturation magnetization value $M_s > 400$ emu/cc. In other embodiments, the at least one interface layer comprises a layer of a high moment element or alloy selected from iron (Fe) or cobalt (Co), and their alloys containing at least one element selected from chromium (Cr), platinum (Pt), tantalum (Ta), boron (B), molybdenum (Mo), ruthenium (Ru), silicon (Si), germanium (Ge), niobium (Nb) and nickel (Ni).

In accordance with particular embodiments of the present invention, the at least one interface layer comprises Co and one or more elements selected from the group consisting of chromium (Cr), platinum (Pt), tantalum (Ta), boron (B), iron (Fe), copper (Cu), silver (Ag), tungsten (W), molybdenum (Mo), ruthenium (Ru), silicon (Si), germanium (Ge), niobium (Nb) and nickel (Ni), and at least one oxide material containing one or more elements selected from the group consisting of aluminum (Al), silicon (Si), titanium (Ti), vanadium (V), manganese (Mn), cobalt (Co), nickel (Ni), zinc (Zn), yttrium (Y), zirconium (Zr), niobium (Nb), molybdenum (Mo), hafnium (Hf) and tungsten (W).

According to embodiments of the present invention, the layer stack further includes at least one additional stacked pair of layers between the main recording layer and the non-magnetic spacer layer, comprising a perpendicularly anisotropic magnetic layer and a non-magnetic spacer layer, such that the layer stack comprises alternating magnetic layers and non-magnetic spacer layers, and magnetic energies of the magnetic layers and coupling energies between the magnetic layers are selected to provide anti-parallel alignment of magnetic moments of adjacent magnetic layers during data storage in the medium. In certain embodiments the at least one interface layer is at at least one interface between the non-magnetic spacer layers and the main recording layers and the stabilization layer.

In accordance with particular embodiments of the present invention, the stabilization layer and the main recording layer each comprise at least one layer that is about 3 to about 300 Å thick and comprises a ferromagnetic Co alloy containing at least one element selected from Pt, Ta, B, Mo, Ru, Si, Ge, Nb, Fe, Ni, and W and at least one oxide material containing one or more elements selected from the group consisting of Cr, Al, Si, Ti, V, Mn, Co, Ni, Zn, Y, Zr, Nb, Mo, Hf and W. In certain embodiments, the stabilization layer and the main recording layer comprises of a CoPt or CoPtCr alloy with up to 12 molar % of Cr and Co oxide, or a CoPt or CoPtCr alloy with 2 to 10 molar % of $SiO_2$ and up to 10 molar % of Cr and Co oxide, or a CoPt or CoPtCr alloy with 2 to 7 molar % of $Nb_2O_5$ and up to 10 molar % of Cr and Co oxide, or a CoPt or CoPtCr alloy with 2 to 9 molar % of $WO_3$ and up to 10 molar % of Cr and Co oxide or a CoPt or CoPtCr alloy with 2 to 15 molar % of $ZrO_2$ and up to 10 molar % of Cr and Co oxide, or a CoPt or CoPtCr alloy with 2 to 15 molar % of $TiO_2$ and up to 10 molar % of Cr and Co oxide. In certain embodiments, the up to 10 or 12 molar % of Cr and Co oxide include $Cr_2O_3$ and CoO, respectively.

According to embodiments of the present invention, the stabilization layer comprises a layer of a $[CoX/(Pd\ or\ Pt)]_n$, $[FeX/(Pd\ or\ Pt)]_n$, or $[FeCoX/(Pd\ or\ Pt)]_n$, multilayer magnetic superlattice structure where n is an integer from about 1 to about 25 and X is at least one element selected from the group consisting of Pt, Ta, B, Mo, Ru, Si, Ge, Nb, Ni, Cr and W.

In accordance with particular embodiments of the present invention, the non-magnetic substrate comprises a material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof. In other embodiments, the underlayer comprises an about 500 to about 4,000 Å thick layer comprised of at least one soft ferromagnetic material selected from Ni, NiFe (Permalloy), Co, CoZr, CoZrCr, CoZrNb, CoTaZr, CoFe, Fe, FeN, FeSiAl, FeSiAlN, FeTaC, FeAlN, FeCo, FeCoNi, CoFeCr, CoFeCrB, FeTaN, CoFeZr, FeCoB, and FeCoC.

According to one aspect of the present invention, the perpendicular magnetic recording medium further comprises (c) a protective overcoat layer on the main recording layer; and (d) a lubricant topcoat layer over the protective overcoat layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features.

DESCRIPTION OF THE INVENTION

The present invention is based upon the recognition that very high areal recording density perpendicular magnetic recording media, having improved thermal stability and SMNR, can be reliably and controllably manufactured by providing a multi-layered structure comprising at least one pair of vertically spaced-apart, magnetically hard, perpendicular ferromagnetic layers, i.e., a lower, stabilization layer (i.e., further from the recording head) and an upper, main recording layer (i.e., closer to the recording head), which spaced-apart layers are anti-ferromagnetically coupled together by interposition of a magnetic coupling structure therebetween, whereby the magnetic moments of the pair of perpendicular ferromagnetic layers are oriented anti-parallel. According to the invention, the magnetic coupling structure is comprised of a thin non-magnetic spacer layer, or a combination of a thin non-magnetic spacer layer and a thin ferromagnetic interface layer that may be present at at least one interface between the pair of perpendicular ferromagnetic layers and the non-magnetic spacer layer, wherein provision of the at least one thin ferromagnetic interface layer provides enhanced RKKY-type magnetic coupling between the perpendicular ferromagnetic layers, hence increased thermal stability.

The inventive methodology affords several advantages not obtainable according to the conventional art, including, inter alia, increased anti-parallel oriented, RKKY-type magnetic coupling (AFC) between vertically spaced-apart pairs of magnetically hard, perpendicular ferromagnetic layers composed of alloy compositions typically employed in the fabrication of perpendicular recording media, hence improved thermal stability and SMNR; and reliable, controllable, and cost-effective formation of very high areal recording density, thermally stable perpendicular magnetic recording media utilizing conventional manufacturing techniques and instrumentalities, e.g., sputtering techniques and apparatus.

According to the invention, the thin non-magnetic thin spacer layer may be comprised of a non-magnetic material, e.g., Ru, Rh, Ir, Cr, Cu, Re, V, and their alloys, and the at least one interface layer comprises a ferromagnetic material having a saturation magnetization value $M_s > 400$ emu/cc, and is comprised of a layer of a high moment element or alloy selected from Fe or Co, and their alloys containing at least one element selected from Cr, Pt, Ta, B, Mo, Ru, Si, Ge, Nb and Ni. The concentration of Co or Fe is constant or varies across the thickness of the at least one interface layer from higher near an interface with the non-magnetic spacer layer to lower near an interface with the stabilization layer or the main recording layer.

Figure 2:
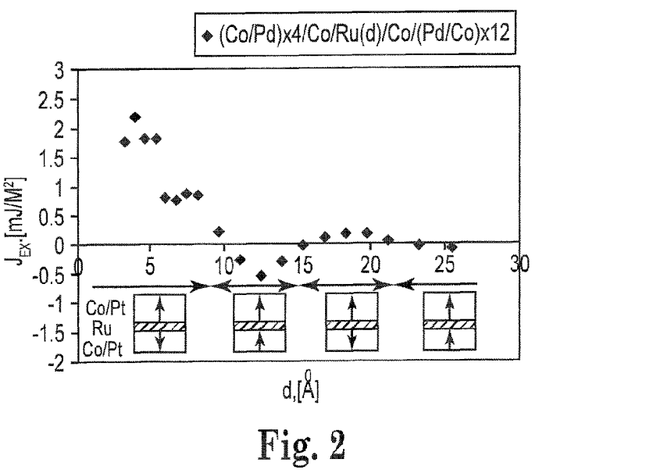
FIG. 2 is a graph for showing the variation of the interface exchange energy density J as a function of Ru spacer layer thickness of an anti-ferromagnetically coupled (AFC), super-lattice-based perpendicular magnetic recording media according to the present invention, having a layer structure of [Co(2.5 Å)/Pt(9 Å)]$_4$/Co(10 Å)/Ru(variable Å)/Co(10 Å)/[Co(2.5 Å)/Pt(9 Å)]$_{12}$.

Referring now to FIG. 2, shown therein is a graph showing the variation of the interface exchange energy density J as a function of Ru spacer layer thickness of an anti-ferromagnetically coupled (AFC), superlattice-based perpendicular magnetic recording media according to the present invention, having a layer structure of [Co(2.5 Å)/Pt(9 Å)]$_4$/Co(10 Å)/Ru (variable Å)/Co(10 Å)/[Co(2.5 Å)/Pt(9 Å)]$_{12}$, wherein it is evident that the greatest amount of anti-ferromagnetic coupling between the spaced-apart pair of perpendicularly magnetically anisotropic multi-layer superlattices is achieved for Ru spacer layer thicknesses between about 3 and about 9 Å.

Figure 3:
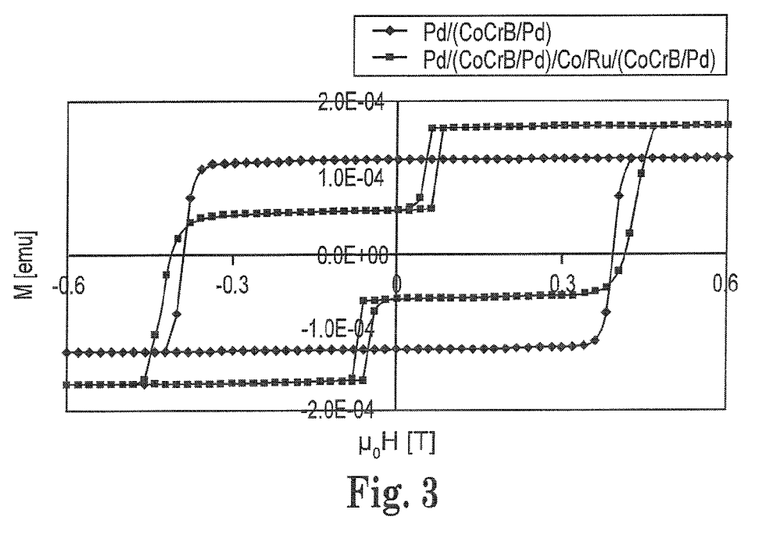
FIG. 3 shows M-H loops of a conventional single layer, superlattice-based perpendicular magnetic recording medium without a magnetically soft underlayer and a super-lattice-based, AFC perpendicular magnetic recording medium without a magnetically soft underlayer, having respective layer structures of Pt(60 Å)/[CoCrB(2.5 Å)/Pt(9 Å)]$_{12}$ and Pt(60 Å)/[CoCrB(2.5 Å)/Pt(9 Å)]$_4$/Co(2 Å)/Ru(~5 Å)/[CoCrB(2.5 Å)/Pt(9 Å)]$_{12}$.

FIG. 3 shows M-H loops of a conventionally configured, single layer, superlattice-based perpendicular magnetic recording medium without a magnetically soft underlayer and a superlattice-based, AFC perpendicular magnetic recording medium without a magnetically soft underlayer, having respective layer structures of Pt(60 Å)/[CoCrB(2.5 Å)/Pt(9 Å)]$_{12}$ and Pt(60 Å)/[CoCrB(2.5 Å)/Pt(9 Å)]$_4$/Co(2 Å)/Ru(~5 Å)/[CoCrB(2.5 Å)/Pt(9 Å)]$_{12}$. In either instance, the medium was formed on a non-magnetic substrate with a non-magnetic seed or underlayer thereon. As for the AFC medium, the main recording layer was constituted by the [CoCrB(2.5 Å)/Pt(9 Å)]$_{12}$ superlattice structure and the stabilization layer was constituted by the [CoCrB(2.5 Å)/Pt(9 Å)]$_4$ superlattice structure. The thin Co layer between the [CoCrB(2.5 Å)/Pt(9 Å)]$_4$ stabilization layer and the Ru spacer layer serves as a thin interface layer for enhancing RKKY-type coupling of the main recording and stabilization layers across the Ru spacer layer. As is evident from FIG. 3, at zero externally applied magnetic field, the magnetic moments of the main recording and stabilization layers are anti-ferromagnetically aligned mainly as a result of the RKKY-type coupling therebetween. It follows that the total magnetic moment of the medium in the data storage state is reduced and equal to $(M_r t)_{total} = (M_r t)_{main\ layer} - (M_r t)_{stabilization\ layer}$, where $M_r$ and t are the remanent magnetization and thickness, respectively, of the layers. Therefore, by using AFC, a stable recording media design with low $(M_r t)_{total}$ can be obtained.

Figure 4:
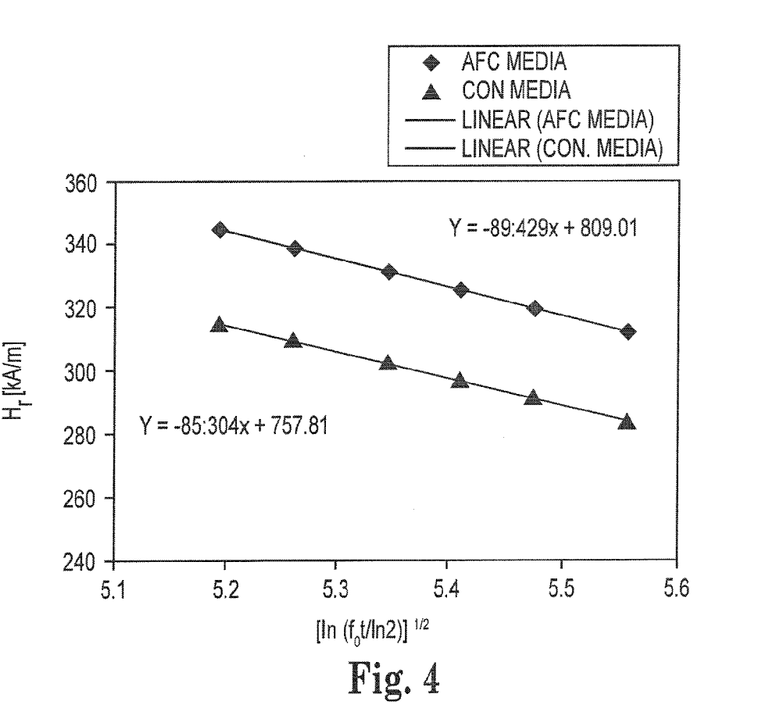
FIG. 4 shows dynamic coercivity measurements of AFC perpendicular and conventional magnetic recording media, i.e., the variation of remanent coercivity ($H_r$) as a function of the duration (t) of magnetic field application in vibrating sample magnatometer (VSM) measurements.

Furthermore, such AFC media have improved stability arising from the anti-ferromagnetic coupling between the main recording and stabilization layers. Adverting to FIG. 4, shown therein is the variation of remanent coercivity ($H_r$) as a function of the duration (t) of magnetic field application in vibrating sample magnatometer (VSM) measurements. The data are plotted therein using the following equation: $H_r(t) = H_A\{1 - [k_B T/(KV)_{eff} \ln(f_0 t/\ln 2)]^{1/2}\}$, where $H_A$ is the effective anisotropy field, T is the temperature, $k_B$ is the Boltzmann constant, and $f_0$ is the measurement frequency of $\sim 3.5 \times 10^{10}$ Hz. The effective energy barrier $(KV)_{eff}$ was determined from a linear fit as 78.9 $k_B T$ for magnetic grains in the conventional media and 81.9 $k_B T$ for the magnetic grains in the main recording layer of the AFC media of the invention. The observed increase in the effective energy barrier for magnetic grains in the AFC media is due to the anti-ferromagnetic coupling between the main recording and stabilization layers. The above data demonstrate the efficacy of the inventive concept of anti-ferromagnetically coupling together a pair of vertically spaced-apart perpendicularly anisotropic magnetic layers to effect anti-parallel alignment of their respective magnetic moments to obtain increased thermal stability and SMNR.

Figure 5:
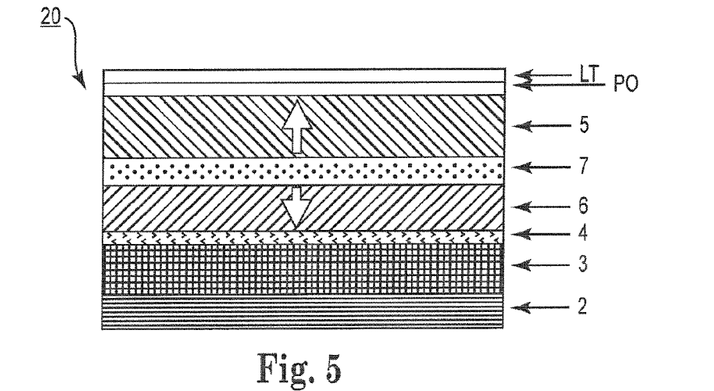
FIGS. 5-9 schematically illustrate, in simplified cross-sectional view, portions of embodiments of anti-ferromagnetically coupled (AFC) perpendicular magnetic recording media according to the present invention.

Adverting to FIGS. 5-9, schematically illustrated therein, in simplified cross-sectional view, are portions of several embodiments of anti-ferromagnetically coupled (AFC) perpendicular magnetic recording media according to the present invention. A first embodiment of a magnetic recording medium 20 according to the invention is shown in FIG. 5 and includes a non-magnetic spacer layer for providing RKKY-type anti-ferromagnetic (AFC) coupling of a pair of vertically spaced apart, magnetically hard, perpendicular ferromagnetic layers, i.e., a lower, stabilization layer and an upper, main recording layer. More specifically, medium 20 comprises a non-magnetic substrate 2 for supporting the layer stack constituting the medium, which substrate 2 is formed of a non-magnetic material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof. The thickness of substrate 2 is not critical; however, in the case of magnetic recording media for use in hard disk applications, substrate 2 must be of a thickness sufficient to provide the necessary rigidity.

Figure 10:
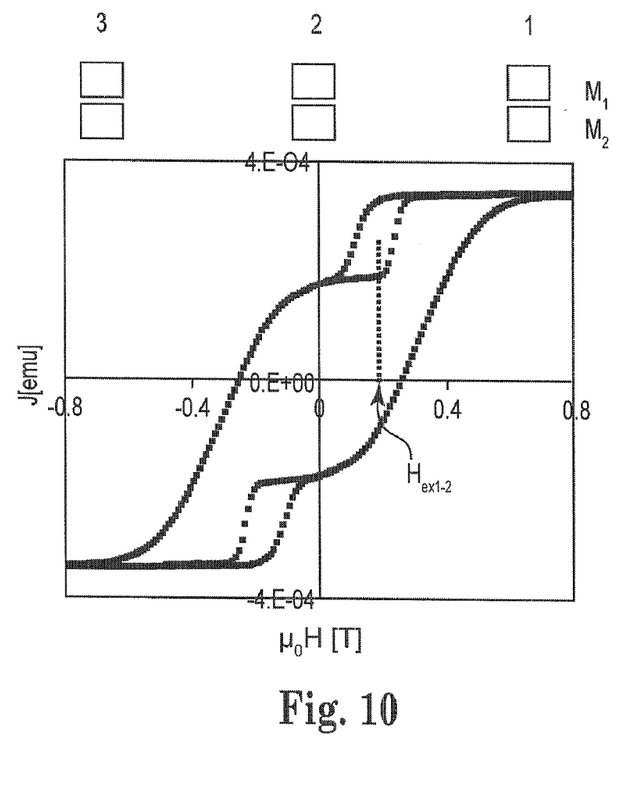
FIG. 10 shows a BH loop of an AFC perpendicular medium having the following media design: soft underlayer/interlayer (combination of fcc and hcp structure)/CoPtCr [4 nm]/Co/Ru/Co/CoPtCrTa[14 nm].

FIG. 10 shows a BH loop of an AFC perpendicular medium having the following media design: soft underlayer/interlayer (combination of fcc and hcp structure)/CoPtCr[4 nm]/Co/Ru/Co/CoPtCrTa[14 nm], wherein: 1→2 the stabilization layer $M_2$ relaxes to anti-parallel state, $H_{ex1-2} = J_{ex}/(\mu_0 M_{S2} \delta_2)$ and 2→3 the main layer, $M_1$, switch, $H_{ex2-1} = J_{ex}/(\mu_0 M_{S1} \delta_1 \cdot \delta_{1,2})$ is thickness of layers 1 and 2 and $J_{ex}$ is the exchange energy.

Overlying and in contact with the upper surface of substrate 2 is a soft magnetic underlayer 3 comprised of an about 500 to about 4,000 Å thick layer, comprised of at least one soft ferromagnetic material selected from Co, CoZr, CoZrCr, CoZrNb, CoTaZr, CoFe, Fe, FeN, FeSiAl, FeSiAlN, FeTaC, FeAlN, FeCo, FeCoNi, CoFeCr, CoFeCrB, FeTaN, CoFeZr, FeCoB, and FeCoC. By way of illustration only, soft magnetic underlayer 3 may comprise an about 2,000 Å thick layer of FeCoB. Alternatively, soft magnetic underlayer 3 may comprise a plurality of layers of soft magnetic material. At least one thin, non-magnetic interlayer 4 is formed in overlying contact with the upper surface of the soft magnetic underlayer 3. The non-magnetic interlayer 4 is selected from one or more of elements selected from the group consisting of Ru, Re, Ir, Cu, Ag, Au, Zr, Hf, Pr, Pd and Ti, containing minor amounts of bcc-structured elements selected from the group consisting of W, Mo, Ta, Nb, Cr and V. In certain embodiments, the non-magnetic interlayer 4 further comprises at least one oxide material containing one or more elements selected from the group consisting of Al, Si, Ti, V, Mn, Co, Ni, Zn, Y, Zr, Nb, Mo, Hf and W. The non-magnetic interlayer 4 is from about 0.2 nm to about 40 nm thick, preferably from about 4 nm to about 12 rim thick.

According to the invention, the single magnetically hard, perpendicular ferromagnetic recording layer 5 of the conventionally configured perpendicular magnetic recording medium 1 illustrated in FIG. 1 is replaced with a sandwich-type structure comprised of a pair of strongly anti-ferromagnetically coupled (AFC), magnetically hard, perpendicular ferromagnetic layers spaced apart by means of a coupling structure. More specifically the sandwich-type AFC structure comprises a first, or lower magnetically hard, ferromagnetic stabilization layer with perpendicular anisotropy 6, termed a "stabilization layer" and a second, or upper magnetically hard, perpendicularly anisotropic main recording layer 5, termed a "main recording layer", which pair of layers are spaced apart by a coupling structure including at least a thin, non-magnetic spacer layer 7 comprised of a non-magnetic material selected to provide a large RKKY-type anti-ferromagnetic coupling (AFC) effect.

By way of illustration, but not limitation, each of the stabilization layer 6 and main recording layer 5 may comprise an about 3 to about 300 Å thick layer of a ferromagnetic Co alloy containing at least one element selected from Pt, Ta, B, Mo, Ru, Si, Ge, Nb, Fe, Ni, and W and at least one oxide material containing one or more elements selected from the group consisting of Al, Si, Ti, V, Mn, Co, Ni, Zn, Y, Zr, Nb, Mo, Hf and W. As an example, the stabilization layer 6 and main recording layer 5 may comprise a CoPt or CoPtCr alloy with up to 12 molar % of Cr and Co oxide, or a CoPt or CoPtCr alloy with 2 to 10 molar % of $SiO_2$ and up to 10 molar % of Cr and Co oxide, or a CoPt or CoPtCr alloy with 2 to 7 molar % of $Nb_2O_5$ and up to 10 molar % of Cr and Co oxide, or a CoPt or CoPtCr alloy with 2 to 9 molar % of $WO_3$ and up to 10 molar % of Cr and Co oxide or a CoPt or CoPtCr alloy with 2 to 15 molar % of $ZrO_2$ and up to 10 molar % of Cr and Co oxide, or a CoPt or CoPtCr alloy with 2 to 15 molar % of $TiO_2$ and up to 10 molar % of Cr and Co oxide.

In other embodiments, the stabilization layer 6 and main recording layer 5 may comprise an about 10 to about 300 Å thick layer of a [CoX/(Pd or Pt)]n, [FeX/(Pd or Pt)]$_n$, or [FeCoX/(Pd or Pt)]$_n$ multilayer magnetic superlattice structure where n is an integer from about 1 to about 25 and X is at least one element selected from the group consisting of Pt, Ta, B, Mo, Ru, Si, Ge, Nb, Ni, Cr and W. Each of the alternating layers of Co-based, Fe-based, or CoFe-based magnetic alloy is from about 1.5 to about 10 Å thick and each of the alternating layers of non-magnetic Pd or Pt is from about 3 to about 15 Å thick; and the coupling structure including at least thin, non-magnetic spacer layer 7 providing a large amount of anti-ferromagnetic coupling between the stabilization and main recording layers may comprise an about 2 to about 20 Å thick, e.g., an about 4 to about 11 Å thick, layer of a non-magnetic material selected from the group consisting of Ru, Rh, Ir, Cr, Cu, Re, V, and their alloys.

The perpendicular magnetic recording media in accordance with the present subject matter is defined on the basis by which the magnetic grains are mutually separated, i.e., segregated, in order to physically and magnetically de-couple the grains and provide improved media performance characteristics. As an example, magnetic media with Co-based alloy perpendicular magnetic recording layers include segregation of the grains by formation of oxides at the boundaries between adjacent magnetic grains to form so-called "granular" media, which oxides may be formed by introducing a minor amount of at least one reactive gas, i.e., oxygen ($O_2$) to the inert gas (e.g., Ar) atmosphere during sputter deposition of the Co alloy-based perpendicular magnetic layer. Granular perpendicular magnetic recording media may be fabricated by a method wherein the magnetic recording media is exposed to the ambient, i.e., $O_2$-containing, atmosphere in order to form a surface oxide layer on the magnetic recording layer prior to deposition of a protective overcoat layer thereon, e.g., a carbon (C)-based layer, such as diamond-like carbon (DLC). Methods for forming "granular" perpendicular magnetic recording layers of the present invention include, but are not limited to reactive sputtering in an atmosphere containing $O_2$ gas and for performing post-deposition oxidation treatment of such layers in the ambient, i.e., $O_2$-containing, atmosphere or in dedicated oxidation chambers or stations supplied with $O_2$ gas. Another example includes reactive sputter deposition of the magnetic layer wherein the oxide material is incorporated in the sputtering target.

Medium 20 may further comprise protective overcoat PO and lubricant topcoat LT layers sequentially formed in conventional fashion, as by sputtering and dipping, respectively, over the upper surface of the second, or upper, ferromagnetic layer 6, which layers are present but not shown in the embodiments of FIGS. 6-9 in order not to unnecessarily obscure the key features of the invention.

Figure 6:
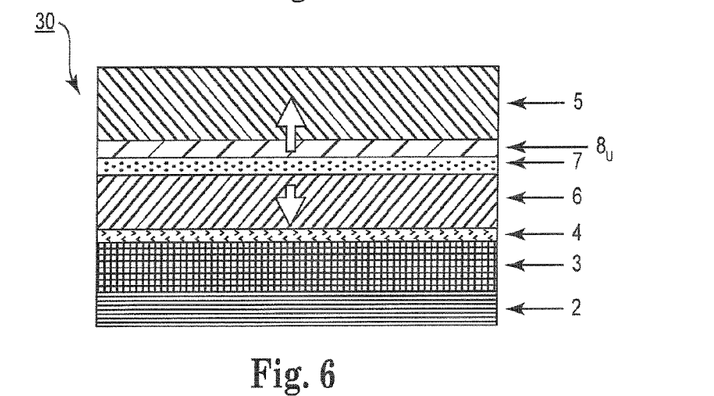
Figure 7:
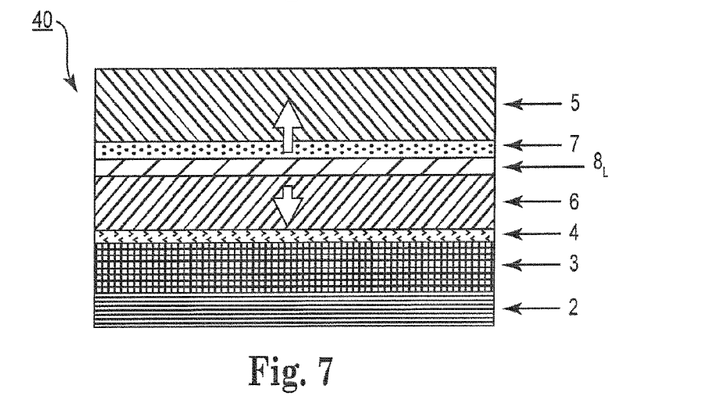
Figure 8:
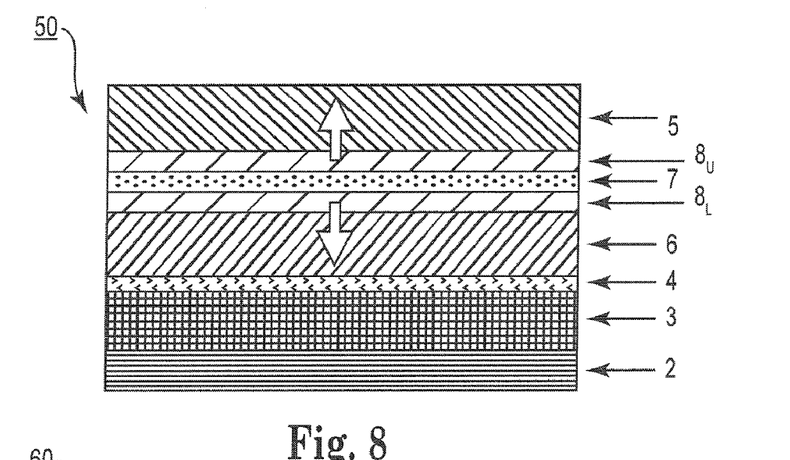

FIGS. 6-8, respectively, illustrate embodiments of the present invention wherein the coupling structure consists essentially of the aforementioned non-magnetic spacer layer 7 interposed between vertically spaced-apart stabilization and main recording layers 6 and 5, respectively, and at least one ferromagnetic interface layer 8 at at least one interface between the non-magnetic spacer layer 7 and the upper, main recording layer 5 and/or the lower, stabilization layer 6 for further increasing RKKY-type coupling between the lower and upper perpendicular ferromagnetic layers 6 and 5, respectively.

More specifically, FIG. 6 illustrates an embodiment of an AFC perpendicular magnetic recording medium 30 according to the invention, wherein a ferromagnetic interface layer $8_U$ is present at the interface between the non-magnetic spacer layer 7 and the upper, main recording layer 5; FIG. 7 illustrates an embodiment of a magnetic recording medium 40 according to the invention, wherein a ferromagnetic interface layer $8_L$ is present at the interface between the non-magnetic spacer layer 7 and the lower, stabilization layer 5; and FIG. 8 illustrates an embodiment of a magnetic recording medium 50 according to the invention, wherein a ferromagnetic interface layer $8_U$, $8_L$ is present at each of the interfaces between the non-magnetic spacer layer 7 and the upper, main recording layer 5 and the lower, stabilization layer 5.

According to the invention, each of the ferromagnetic interface layers 8, $8_U$, and $8_L$ of media 30, 40, and 50 comprises an about 1 monolayer to an about 40 Å thick layer of a ferromagnetic material having a saturation magnetization value $M_S$>400 emu/cc. Each of the ferromagnetic interface layers 8, $8_U$, and $8_L$ may comprise a high moment element or alloy selected from Fe or Co, and their alloys containing at least one element selected from Cr, Pt, Ta, B, Mo, Ru, Si, Ge, Nb and Ni. The concentration of Co or Fe is constant or varies across the thickness of the at least one interface layer 8, $8_U$, and $8_L$ from higher near an interface with the non-magnetic spacer layer 7 to lower near an interface with the lower, stabilization layer 6 or the upper, main recording layer 5. In certain embodiments, each of the ferromagnetic interface layers 8, $8_U$, and $8_L$ may comprise Co and one or more elements selected from the group consisting of Cr, Pt, Ta, B, Fe, Cu, Ag, W, Mo, Ru, Si, Ge Nb and Ni, and at least one oxide material containing one or more elements selected from the group consisting of Al, Si, Ti, V, Mn, Co, Ni, Zn, Y, Zr, Nb, Mo, Hf and W.

The present invention also contemplates formation of magnetic recording media comprising at least one additional stacked pair of layers between the main recording layer 5 and the non-magnetic spacer layer 7. Each additional stacked pair of layers comprises a magnetic layer with perpendicular magnetic anisotropy and a non-magnetic spacer layer, such that magnetic layers and non-magnetic spacer layers alternate across the thickness of the layer stack. The magnetic energy of the magnetic layers and the coupling energy between adjacent magnetic layers (primarily RKKY-type coupling and dipole-dipole interactions) are adjusted to provide anti-parallel alignments of the magnetic moments of adjacent magnetic layers in the data storage state of the media.

Figure 9:
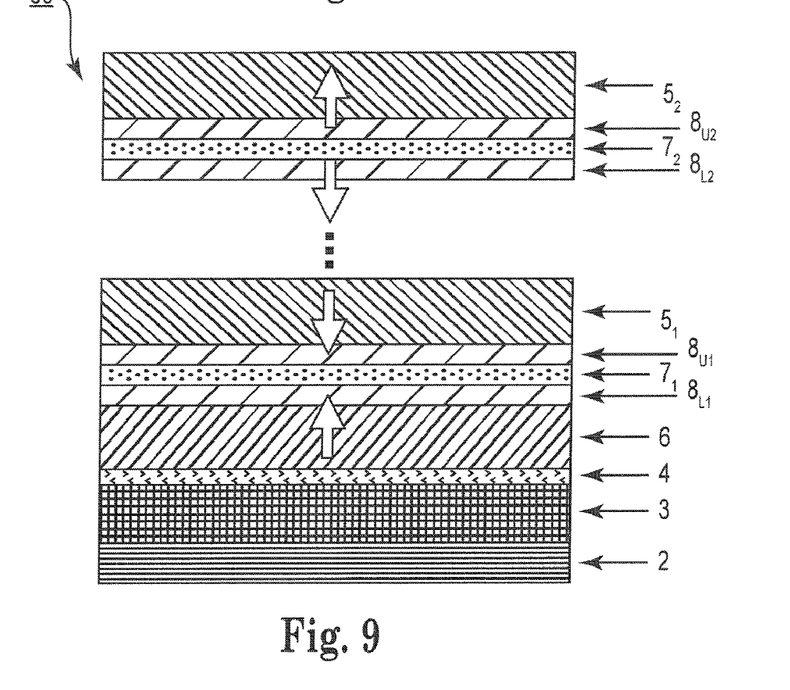

FIG. 9 illustrates a magnetic medium 60 comprising 2 stacked pairs of magnetically coupled perpendicular ferromagnetic layers $5_1$, $5_2$ and respective thin non-magnetic spacer layers $7_1$, $7_2$, along with respective lower thin ferromagnetic interface layers $8_{L1}$, $8_{L2}$ and upper thin ferromagnetic interface layers $8_{U1}$, $8_{U2}$. Medium 60 further includes one perpendicularly magnetically anisotropic stabilization layer 6.

Advantageously, each of the illustrated thin film layers of the media of the present invention, including those of the magnetic coupling structure, may be deposited or otherwise formed by conventional physical vapor deposition (PVD) techniques (not described herein for brevity), e.g., sputtering, or by a combination of PVD techniques selected from sputtering, vacuum evaporation, etc.

The present invention thus advantageously provides high quality, thermally stable, high areal recording density perpendicular magnetic recording media, which media achieve improved thermal stability and SMNR via magnetic coupling of a magnetically hard, perpendicular main ferromagnetic recording layer with another magnetically hard perpendicular ferromagnetic layer, i.e., a stabilization layer. Moreover, the inventive methodology can be practiced in a cost-effective manner utilizing conventional manufacturing technology and equipment (e.g., sputtering technology/equipment) for automated, large-scale manufacture of magnetic recording media, such as hard disks. Finally, the invention is not limited to use with hard disks but rather is broadly applicable to the formation of thermally stable, high areal density perpendicular magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An anti-ferromagnetically coupled ("AFC") perpendicular magnetic recording medium, comprising:
    a ferromagnetic stabilization layer with perpendicular anisotropy;
    a non-magnetic spacer layer, wherein the non-magnetic spacer layer comprises Ru and an oxide selected from Si, Nb, Cr, W, Zr, or Ti; and
    a perpendicularly anisotropic main recording layer, wherein said ferromagnetic stabilization layer and said perpendicularly anisotropic main recording layer are anti-ferromagnetically coupled across said non-magnetic spacer layer, and
    each of the stabilization layer and the main recording layer comprise a ferromagnetic Co alloy, wherein the Co alloy comprises:
    at least one element selected from Cr, Pt, Ta, B, Mo, Ru, Si, Ge, Nb, Fe, Ni and W, and
    at least one oxide material selected from Al, Si, Ti, V, Mn, Co, Ni, Zn, Y, Zr, Nb, Mo, Hf and W.

2. The perpendicular magnetic recording medium as in claim 1, wherein:
    said non-magnetic spacer layer is from about 2 to about 20 Å thick, selected to maximize anti-ferromagnetic coupling between the stabilization layer and the main recording layer.

3. The perpendicular magnetic recording medium as in claim 2, wherein: said non-magnetic spacer layer comprises Ru with 2 to 10 molar % of $SiO_2$, or Ru with 2 to 7 molar % of $Nb_2O_5$, or Ru with 2 to 7 molar % of $Cr_2O_3$, or Ru with 2 to 9 molar % of $WO_3$, or Ru with 2 to 15 molar % of $ZrO_2$, or Ru with 2 to 15 molar % of $TiO_2$.

4. The perpendicular magnetic recording medium as in claim 2, further comprising at least one ferromagnetic interface layer at an interface between said non-magnetic spacer layer and said main recording layer.

5. The perpendicular magnetic recording medium as in claim 2, further comprising at least one ferromagnetic interface layer at an interface between said non-magnetic spacer layer and said stabilization layer.

6. The perpendicular magnetic recording medium as in claim 2, further comprising at least one ferromagnetic interface layer at interfaces between said non-magnetic spacer layer and each of said main recording layer and said stabilization layer.

7. The perpendicular magnetic recording medium as in claim 1, wherein:
    said layer stack further includes at least one additional stacked pair of layers between said main recording layer and said non-magnetic spacer layer, comprising a perpendicularly anisotropic magnetic layer and a non-magnetic spacer layer, such that said layer stack comprises alternating magnetic layers and non-magnetic spacer layers, and magnetic energies of said magnetic layers and coupling energies between said magnetic layers are selected to provide anti-parallel alignment of magnetic moments of adjacent magnetic layers during data storage in said medium.

8. The perpendicular magnetic recording medium as in claim 7, further comprising:
    at least one ferromagnetic interface layer at at least one interface between said non-magnetic spacer layers and said main recording layers and said stabilization layer.

9. The perpendicular magnetic recording medium as in claim 1, wherein:
    said stabilization layer and said main recording layer comprises a CoPt or CoPtCr alloy with up to 12 molar % of Cr and Co oxide, or a CoPt or CoPtCr alloy with 2 to 10 molar % of $SiO_2$ and up to 10 molar % of Cr and Co oxide, or a CoPt or CoPtCr alloy with 2 to 7 molar % of $Nb_2O_5$ and up to 10 molar % of Cr and Co oxide, or a CoPt or CoPtCr alloy with 2 to 9 molar % of $WO_3$ and up to 10 molar % of Cr and Co oxide or a CoPt or CoPtCr alloy with 2 to 15 molar % of $ZrO_2$ and up to 10 molar % of Cr and Co oxide, or a CoPt or CoPtCr alloy with 2 to 15 molar % of $TiO_2$ and up to 10 molar % of Cr and Co oxide.

10. The perpendicular magnetic recording medium as in claim 9, wherein the up to 10 or 12 molar % of Cr and Co oxide include $Cr_2O_3$ and CoO, respectively.

11. The perpendicular magnetic recording medium as in claim 1, wherein:
said main recording layer is about 3 to about 300 Å thick.

12. A perpendicular magnetic recording medium, comprising:
a ferromagnetic stabilization layer with perpendicular anisotropy; and
a main recording layer with perpendicular anisotropy;
wherein each of the stabilization layer and the main recording layer comprise a Co alloy comprising at least one element selected from Cr, Pt, Ta, B, Mo, Ru, Si, Ge, Nb, Fe, Ni and W, and at least one oxide material selected from Al, Si, Ti, V, Mn, Co, Ni, Zn, Y, Zr, Nb, Mo, Hf and W; and
a non-magnetic spacer layer between the stabilization layer and the main recording layer, wherein the non-magnetic spacer layer comprises Ru and an oxide selected from Si, Nb, Cr, W, Zr or Ti; and
wherein the stabilization layer and main recording layer are anti-ferromagnetically coupled across the non-magnetic spacer layer.

13. The perpendicular magnetic recording medium of claim 12, wherein the layer stack further comprises a ferromagnetic interface layer at an interface between said non-magnetic spacer layer and said main recording layer, wherein the at least one ferromagnetic interface layer has a saturation magnetization $M_s$ greater than 400 emu/cc, and wherein a concentration of Fe or Co in the ferromagnetic interface layer is higher near the interface with said non-magnetic spacer layer than at an interface with the main recording layer.

14. The perpendicular magnetic recording medium of claim 12, wherein the non-magnetic spacer layer is from about 2 to about 20 Å thick, selected to maximize anti-ferromagnetic coupling between the stabilization layer and the main recording layer.

15. The perpendicular magnetic recording medium of claim 12, wherein the non-magnetic spacer layer comprises Ru with 2 to 10 molar % of $SiO_2$, or Ru with 2 to 7 molar % of $Nb_2O_5$, or Ru with 2 to 7 molar % of $Cr_2O_3$, or Ru with 2 to 9 molar % of $WO_3$, or Ru with 2 to 15 molar % of $ZrO_2$, or Ru with 2 to 15 molar % of $TiO_2$.

16. A perpendicular magnetic recording medium, comprising:
a stabilization layer with perpendicular anisotropy; and
a main recording layer with perpendicular anisotropy;
wherein each of the stabilization layer and the main recording layer comprise a Co alloy comprising:
at least one element selected from Cr, Pt, Ta, and B, and
at least one oxide; and
a non-magnetic spacer layer between the stabilization layer and the main recording layer, wherein the non-magnetic spacer layer comprises Ru and an oxide selected from Si, Nb, Cr, W, Zr, or Ti, and wherein the stabilization layer and main recording layer are anti-ferromagnetically coupled across the non-magnetic spacer layer.

* * * * *

UNITED STATES PATENT AND TRADEMARK OFFICE
CERTIFICATE OF CORRECTION

PATENT NO. : 7,842,409 B2  
APPLICATION NO. : 10/977435  
DATED : November 30, 2010  
INVENTOR(S) : Erol Girt Page 1 of 1

It is certified that error appears in the above-identified patent and that said Letters Patent is hereby corrected as shown below:

In the Claims

Column 12, Claim 3, line 31: "W0$_3$," should be --WO$_3$,--.

Column 12, Claim 9, line 66: "said stabilization layer and said main" should be --said main--.

Column 14, Claim 15, line 19: "W0$_3$," should be --WO$_3$,--.

Signed and Sealed this
Twenty-ninth Day of March, 2011

David J. Kappos
*Director of the United States Patent and Trademark Office*